Jan. 28, 1941.   H. R. MOULTON   2,230,118
PROCESS OF SHAPING OPHTHALMIC LENSES
Filed Sept. 2, 1937
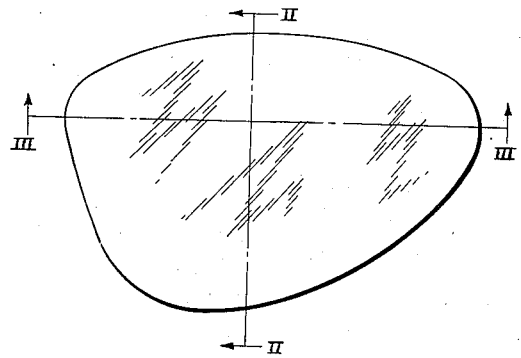
Fig. I
Fig. II
Fig. III
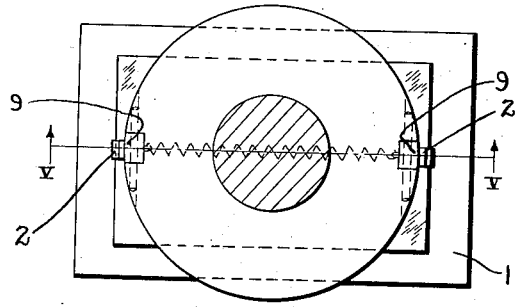
Fig. IV
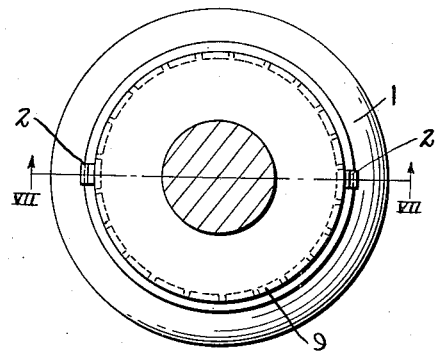
Fig. VI
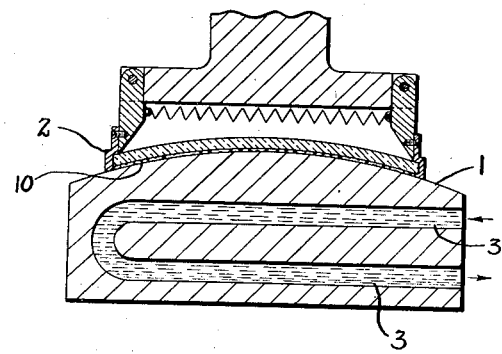
Fig. V
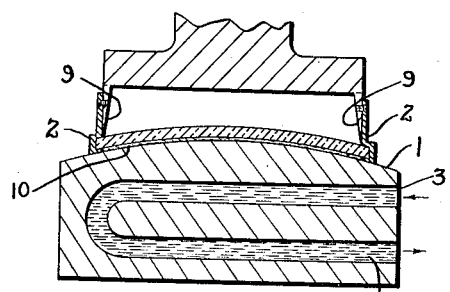
Fig. VII
INVENTOR
HAROLD R. MOULTON.
BY
Harry H. Styll
ATTORNEY Patented Jan. 28, 1941

2,230,118

UNITED STATES PATENT OFFICE 2,230,118

PROCESS OF SHAPING OPHTHALMIC LENSES

Harold R. Moulton, Southbridge, Mass., assignor to American Optical Company, Southbridge, Mass., a voluntary association of Massachusetts Application September 2, 1937, Serial No. 162,151

3 Claims. (Cl. 18—56)

This invention relates to an improved process for making bent or curved lenses of a plastic nonfrangible material suitable for a lens medium.

The objects of the invention are:

To provide a process that will make such a lens that will be freer from variations in refraction than a lens molded or pressed from such material.

To provide a process for making such lenses that is quickly operable, and facile for commercial production and is relatively inexpensive.

Other objects and advantages of the invention will become apparent from the following description taken in connection with the accompanying drawing. It will be apparent that many changes can be made in the arrangements and steps of the process without departing from the spirit of the invention as expressed in the accompanying claims, the preferred arrangements and steps only having been described by way of illustration. I, therefore, do not wish to be limited to the exact details shown and described.

Referring to the drawing:

Fig. I is a front or plan view of a form of lens of the invention;

Fig. II is a cross section of Fig. I on line II—II;

Fig. III is a cross section of Fig. I on line III—III.

Fig. IV is a top or plan view of a lens holder and block employed in the process of the invention;

Fig. V is a cross section of Fig. IV on line V—V;

Fig. VI is a top view of another form of lens holder and block used in the process of the invention; and Fig. VII is a cross section of Fig. VI on line VII—VII.

While the lenses of the invention are usually used for protection lenses in industrial goggles, aviator's goggles, gas masks, protection helmets, sun and eyeshades, such lenses may be used quite generally in the art for various other purposes. Such lenses have hitherto been made of glass which is quite frangible and liable to fracture.

Attempts have been made to mold such lenses from a transparent, vitreous, nonfrangible composition, but it has been found that the molding operations have decreased if not quite destroyed the optical refractive properties of such lenses. It is, therefore, a prime object of this invention to produce these lenses with good optical refractive properties.

Considerable work has now been done in producing good quality material of this nature which would produce good quality lenses if the optical refractive properties could be maintained. There are several of these compositions in the commercial art today. These are put out under various trade names such as Plexiglas, Lucite, Metastyrol. There are also certain commercial phenolic condensation products that may be used for the purpose, such as Bakelite, Catalin, Marblette and Fiberlon.

It is, therefore, a prime object of the invention to produce lenses from these commercial materials which will not have their optical refractive properties marred or decreased.

Lenses of this nature occupy an important place in the art because of their protective properties to the wearer. A lens possessing the property of nonfrangibility together with good optical refraction would be a most valuable acquisition to the art. It is the purpose of this invention to provide such lenses.

The usefulness of the important invention and development of this material has so far been denied the lens art because of the impairment during working of the optical refractive properties.

The material for use in making the lenses of my invention is cast by the material manufacturer between glass surfaces of good optical properties and the resultant sheet as produced has good optical refractive properties.

I take a piece of this flat sheet stock and cut it to the size and shape I want it. I then place this piece in a liquid bath of glycerine or other liquid which bath is heated so that the temperature of the immersed piece may be raised to say from 120 to 140 degrees centigrade. After raising the temperature of the piece to the desired amount in the bath, I remove it and shape it to the curve desired by exerting pressure at the ends or the edges.

If the curve is slight and a simple one, I may shape it simply by the pressure exerted on the ends or edges. To obtain greater accuracy of curvature I may lay it on a shaper block, such as shown at 1 in Fig. V, and apply the pressure at the ends or edges to conform the piece to the shape of the block, or I may provide a lens holder 2, Fig. V, contacting the ends or edges of the piece and press the holder down until the piece conforms with the curvature of the block 1.

This pressure at the ends or edges of the piece of the softened material stretches it and causes it to conform to the curvature of the block or to the desired curvature as the case may be.

This curvature may be cylindrical in form or spherical. In the cylindrical form, the pressure is at the ends of the piece; in the spherical form, the pressure is all around the edges.

After the piece has been pressed to form, I allow it to cool, say to 50 or 60 degrees centigrade. This cooling allows the piece to set to the desired curvature. When cooled, I wash the piece in water. The edges of the finished piece may be edged or not as desired.

As stated, the liquid bath may be glycerine. It may also be ethylene glycol, or other polyhydric alcohol.

The operation described may be performed very quickly and lends itself to facile commercial production.

Where a block is used it will be noted that only one surface of the piece contacts the block. The surface of the block 1 is also preferably treated or painted with glycerine 10 to avoid marring the contacting surface of the piece.

Referring more specifically to the drawing: Figs. I, II, and III show a cylindrical aviator's lens. The surfaces of these lenses have been shown parallel with each other, but they can be made prismatic if desired.

In Figs. IV and V are shown means of holding the lens and applying it to the lens block 1. The lens block 1 may be kept heated to desired temperature by means of a hot liquid such as water circulated through the pipe 3 in the block. The lens holders 2 may engage the edge of the piece at the ends as shown for a cylindrical lens or all around the edge of the piece for a spherical lens as shown in Figs. VI and VII. The holders 2 hold the lens in operative position while the edges of the lens are pressed by the members 9 to bend the lens to desired shape. When used on a cylindrical lens, as shown in Fig. IV, the members 9 need only press the lens at its opposite edges while in the case of a spherical lens, as shown in Fig. VII, it contacts the lens entirely around its periphery or at spaced points on its periphery. The jaws 9 may be related to the block 1 by means of guides if desired so that the operative relationship may be retained.

The jaws 9 of the holder 2 may be made so thin that it will be able to spring a little, so as to stretch the plastic material to a smooth fit with the block 1.

While the lens pieces have been shown with parallel surfaces it is clear that if the surface 1 of the block is different from the upper surface of the lens piece a power lens will be produced.

The temperature control of the baths and blocks may be made automatic as desired.

The lens piece when cooled will retain its shape and curvature because the material has been stretched at an elevated temperature in pressing it to shape, and hence it will not return to its original shape.

From the foregoing it will be seen that I have provided, simple and inexpensive means to obtain the objects and advantages of the invention and to provide a new and improved process for producing a lens of the type described.

Having described my invention, I claim:

1. The process of forming a lens from a substantially flat blank of plastic nonfrangible material of good optical refractive properties having finished optical surfaces, comprising forming said blank to a given size, assembling said blank with a holder with a portion of said holder engaging the blank adjacent the contour edge thereof and exerting a resilient pressure on said blank in the direction of its body portion, heating said blank to render the same plastic and responsive to said resilient urging whereby the said blank will cup by an amount controlled by the pressure on the edge thereof by said resilient means, and urging said blank over a forming member so as to true said cupping to the desired shape while maintaining said resilient action against its edge whereby the blank is formed to the shape of the forming member and the optical surfaces and properties of said blank are maintained substantially unchanged.

2. The process of forming a lens from a substantially flat blank of plastic nonfrangible material of good optical refractive properties and having finished optical surfaces on the opposed sides thereof, comprising forming said blank to a given size, assembling said blank in a holder with a portion of said holder engaging a peripheral portion of at least one side surface of the blank, engaging a portion of the peripheral edge of said blank with another portion of said holder, resiliently urging said other portion of said holder against said edge portion toward the body of the blank and heating said blank to render the material thereof workable and responsive to said resilient urging to provide a cupping of said blank and urging said blank over a forming member so as to true said cupping to the desired shape while maintaining the heat in said blank and said resilient action against said edge whereby the blank is formed to the shape of the forming member and the optical surfaces and properties of said blank are maintained.

3. The process of forming a lens from a substantially flat blank of plastic nonfrangible material of good optical refractive properties and having finished optical surfaces on the opposed sides thereof, comprising forming said blank to a given size, assembling said blank in a holder with a portion of said holder engaging a peripheral portion of at least one side surface of the blank, engaging substantially diametrically opposed portions of the peripheral edge of said blank with another portion of said holder, resiliently urging said other portion of said holder against said edge portions toward the body of the blank and heating said blank in a liquid which is raised to a temperature sufficient to soften the material of the blank while resiliently held in said holder to provide a cupping of said blank and urging said blank over a forming member so as to true said cupping to the desired shape while maintaining the heat in said blank and said resilient action against said edge whereby the blank is formed to the shape of the forming member and the optical surfaces and properties of said blank are maintained substantially unchanged.

HAROLD R. MOULTON.